United States Patent [19]

Fasano

[11] Patent Number: 5,715,571
[45] Date of Patent: Feb. 10, 1998

[54] SHOPPING CART HANDLE COVER

[76] Inventor: Sandy Fasano, 33 Deer Cir., Bear, Del. 19701

[21] Appl. No.: 699,416

[22] Filed: Aug. 19, 1996

[51] Int. Cl.[6] .................................................. A47B 45/02
[52] U.S. Cl. ........................... 16/110 R; 16/DIG. 12; 280/33.992
[58] Field of Search ............................ 16/111 R, 111 A, 16/114 R, 116 R, DIG. 12; 280/33.992; 297/229; 248/104; 150/52 R

[56] References Cited

U.S. PATENT DOCUMENTS

| | | | |
|---|---|---|---|
| 3,866,649 | 2/1975 | Bringmann | 150/52 R |
| 4,805,937 | 2/1989 | Boucher | 280/33.992 |
| 4,881,746 | 11/1989 | Andreesen | 280/33.992 |
| 4,989,811 | 2/1991 | Millis et al. | 248/104 |
| 5,427,392 | 6/1995 | Duer | 280/33.992 |

*Primary Examiner*—Chuck Mah
*Assistant Examiner*—Mark Williams

[57] ABSTRACT

A new Shopping Cart Handle Cover for protecting an infant's mouth from a shopping cart handle by covering the shopping cart handle with a protective covering, and for facilitating entertainment for the infant during shopping. The inventive device includes a wrap around handle cover secured over a shopping cart handle, a toy strap apparatus secured to the wrap around handle cover for securing toys for the infant to play with, and a bottle strap apparatus secured to the wrap around handle cover to support bottles for the infant.

10 Claims, 3 Drawing Sheets

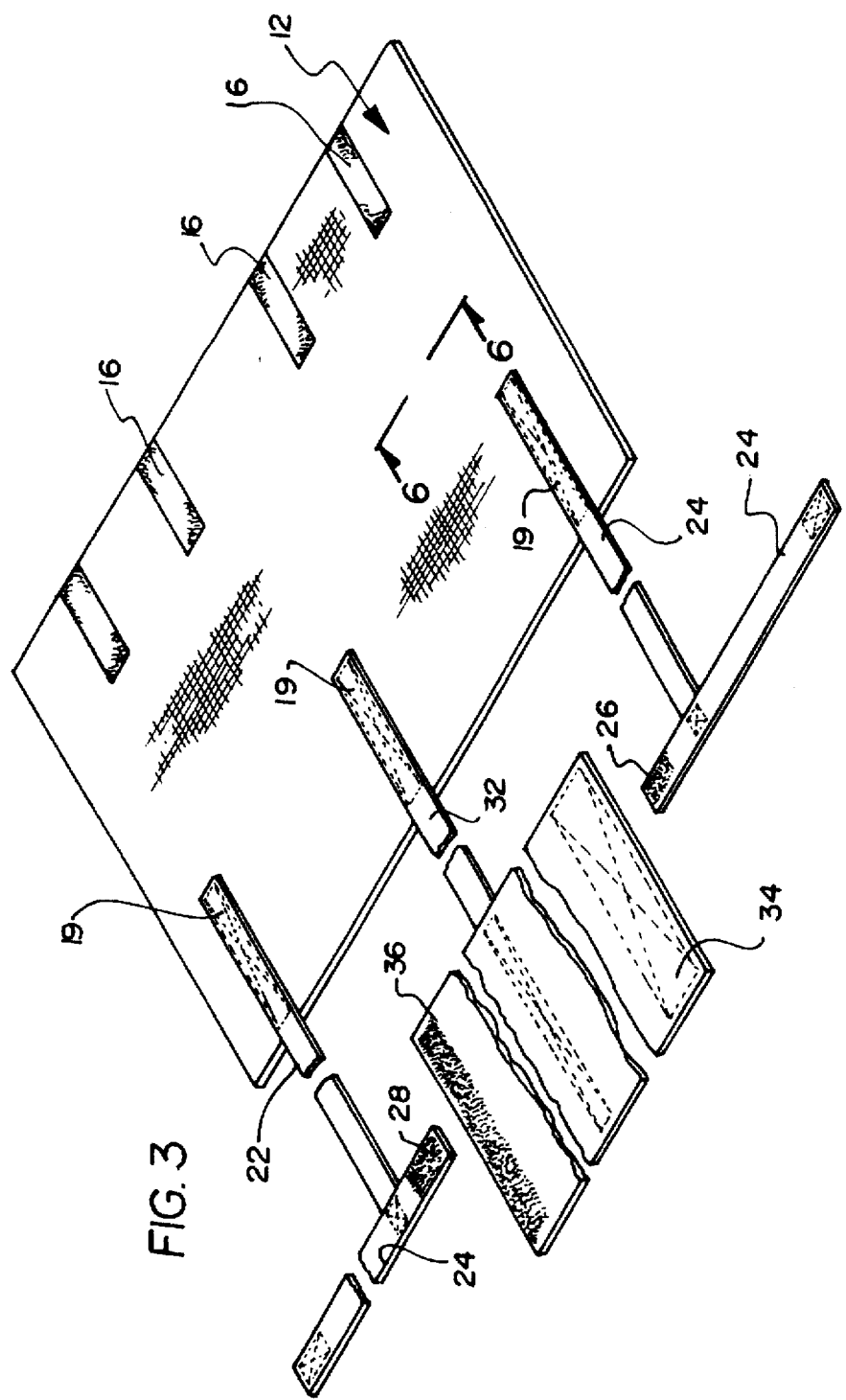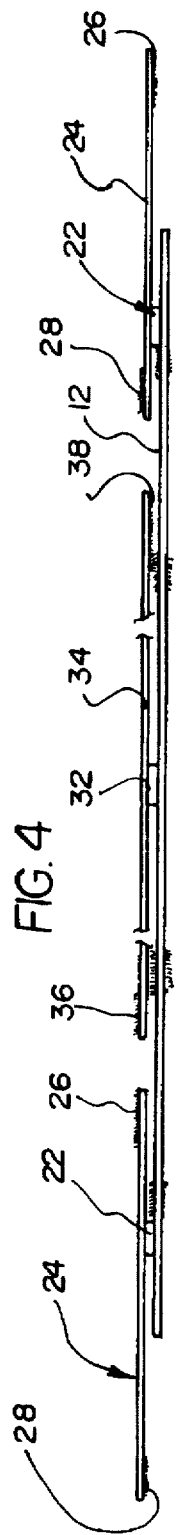

SHOPPING CART HANDLE COVER

BACKGROUND OF THE INVENTION

1. Field of the Invention

The present invention relates to Infant Protective Devices and more particularly pertains to a new Shopping Cart Handle Cover for protecting an infant's mouth from a shopping cart handle by covering the shopping cart handle with a protective covering, and for facilitating entertainment for the infant during shopping.

2. Description of the Prior Art

The use of Infant Protective Devices is known in the prior art. More specifically, Infant Protective Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Infant Protective Devices include U.S. Pat. No. 3,866,649; U.S. Pat. No. 4,540,219; U.S. Design Pat. No. 328,812; U.S. Pat. No. 4,655,502; U.S. Pat. No. 4,416,462 and U.S. Pat. No. 5,425,546.

While these devices fulfill their respective, particular objectives and requirements, the aforementioned patents do not disclose a new Shopping Cart Handle Cover. The inventive device includes a wrap around handle cover secured over a shopping cart handle, a toy strap apparatus secured to the wrap around handle cover for securing toys for the infant to play with, and a bottle strap apparatus secured to the wrap around handle cover to support bottles for the infant.

In these respects, the Shopping Cart Handle Cover according to the present invention substantially departs from the conventional concepts and designs of the prior art, and in so doing provides an apparatus primarily developed for the purpose of protecting an infant's mouth from a shopping cart handle by covering the shopping cart handle with a protective covering, and for facilitating entertainment for the infant during shopping.

SUMMARY OF THE INVENTION

In view of the foregoing disadvantages inherent in the known types of Infant Protective Devices now present in the prior art, the present invention provides a new Shopping Cart Handle Cover construction wherein the same can be utilized for protecting an infant's mouth from a shopping cart handle by covering the shopping cart handle with a protective covering, and for facilitating entertainment for the infant during shopping.

The general purpose of the present invention, which will be described subsequently in greater detail, is to provide a new Shopping Cart Handle Cover apparatus and method which has many of the advantages of the Infant Protective Devices mentioned heretofore and many novel features that result in a new Shopping Cart Handle Cover which is not anticipated, rendered obvious, suggested, or even implied by any of the prior art Infant Protective Devices, either alone or in any combination thereof.

To attain this, the present invention generally comprises a wrap around handle cover secured over a shopping cart handle, a toy strap apparatus secured to the wrap around handle cover for securing toys for the infant to play with, and a bottle strap apparatus secured to the wrap around handle cover to support bottles for the infant.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Shopping Cart Handle Cover apparatus and method which has many of the advantages of the Infant Protective Devices mentioned heretofore and many novel features that result in a new Shopping Cart Handle Cover which is not anticipated, rendered obvious, suggested, or even implied by any of the prior art Infant Protective Devices, either alone or in any combination thereof.

It is another object of the present invention to provide a new Shopping Cart Handle Cover which may be easily and efficiently manufactured and marketed.

It is a further object of the present invention to provide a new Shopping Cart Handle Cover which is of a durable and reliable construction.

An even further object of the present invention is to provide a new Shopping Cart Handle Cover which is susceptible of a low cost of manufacture with regard to both materials and labor, and which accordingly is then susceptible of low prices of sale to the consuming public, thereby making such Shopping Cart Handle Cover economically available to the buying public.

Still yet another object of the present invention is to provide a new Shopping Cart Handle Cover which provides in the apparatuses and methods of the prior art some of the advantages thereof, while simultaneously overcoming some of the disadvantages normally associated therewith.

Still another object of the present invention is to provide a new Shopping Cart Handle Cover for protecting an infant's mouth from a shopping cart handle by covering the shopping cart handle with a protective covering, and for facilitating entertainment for the infant during shopping.

Yet another object of the present invention is to provide a new Shopping Cart Handle Cover which includes a wrap around handle cover secured over a shopping cart handle, a toy strap apparatus secured to the wrap around handle cover for securing toys for the infant to play with, and a bottle strap apparatus secured to the wrap around handle cover to support bottles for the infant.

Still yet another object of the present invention is to provide a new Shopping Cart Handle Cover that keeps a baby busy while the parent is shopping.

Even still another object of the present invention is to provide a new Shopping Cart Handle Cover that protects the baby's mouth from engaging the soiled shopping cart handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention expanded.

FIG. 4 is an end view of the invention.

DESCRIPTION OF THE PREFERRED EMBODIMENT

Figure 1:
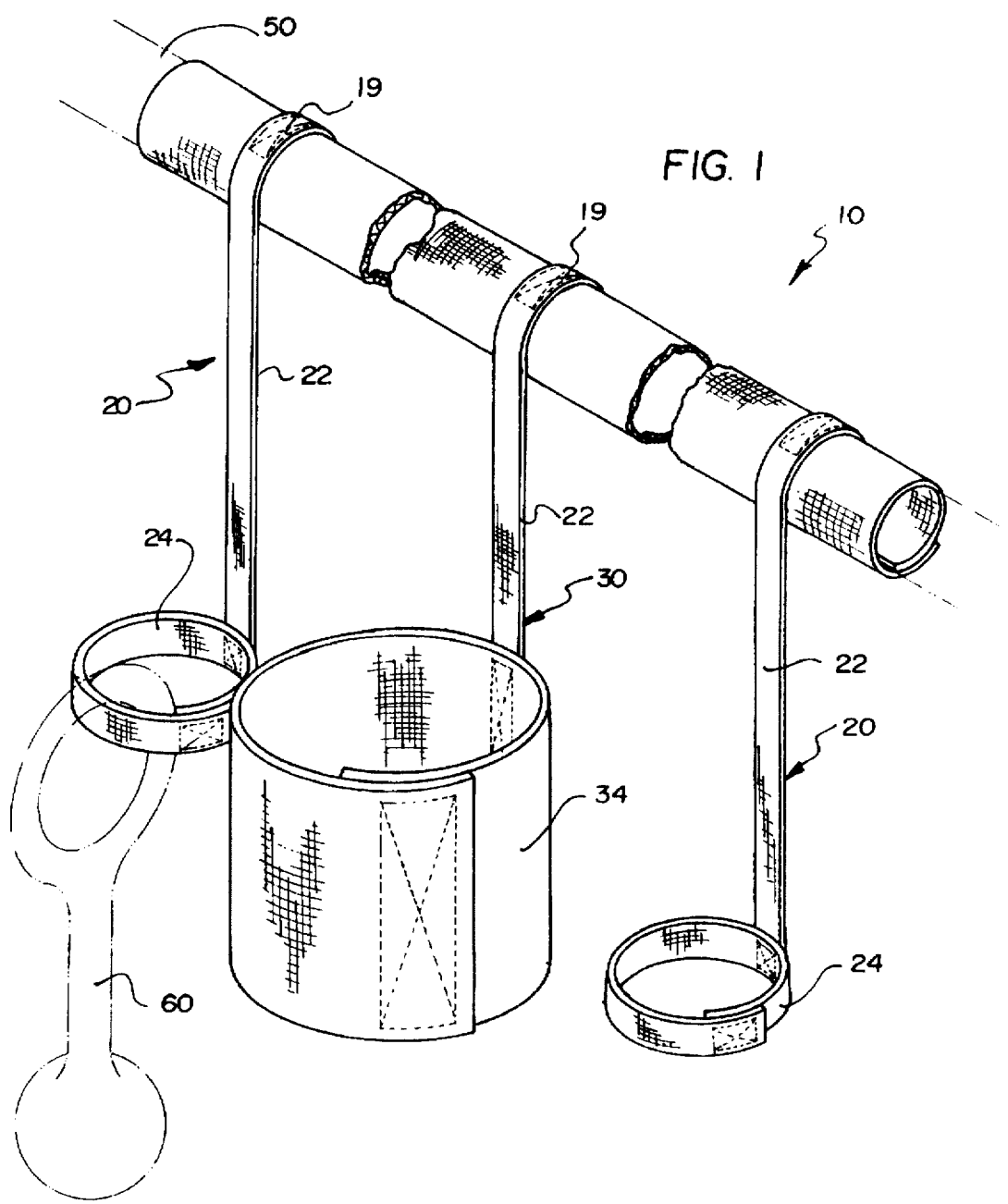
FIG. 1 is a perspective view of a new Shopping Cart Handle Cover according to the present invention.
Figure 2:
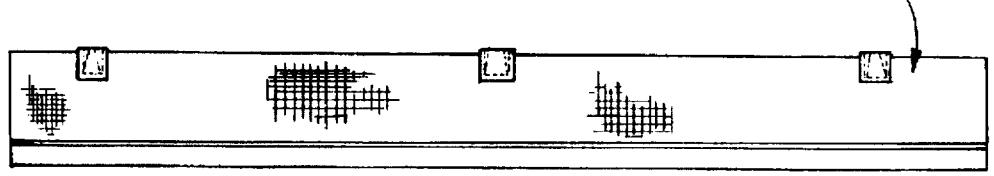
FIG. 2 is a rear view thereof.
Figure 5:
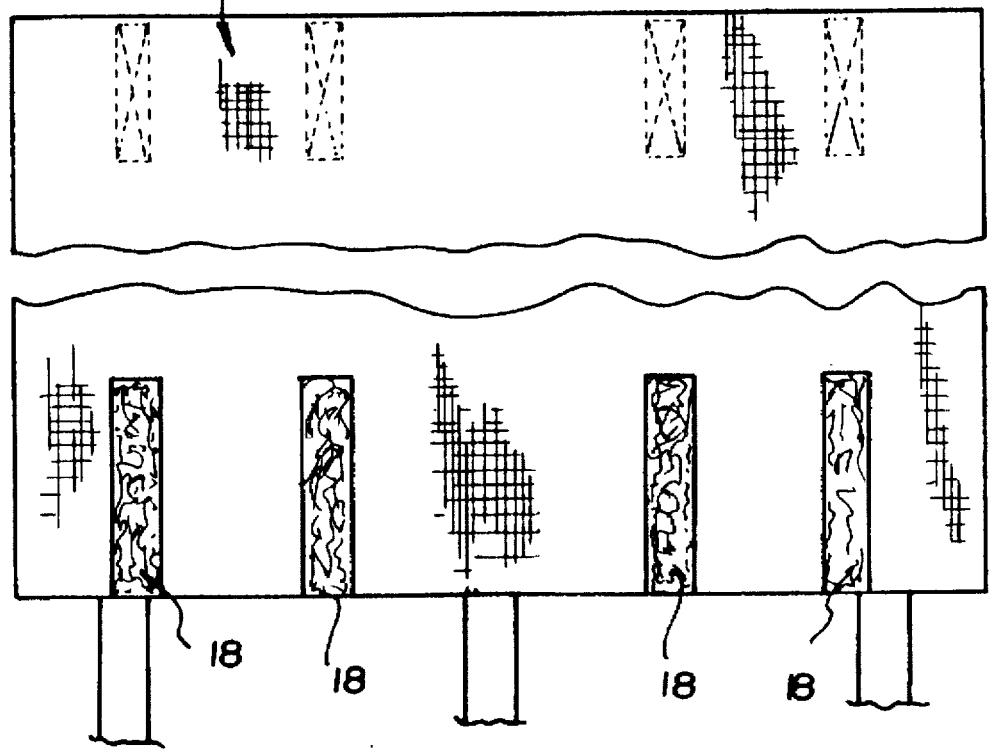
FIG. 5 is a cut away bottom view of the present invention expanded.
Figure 6:
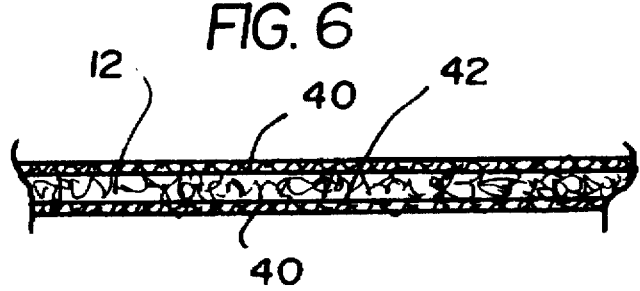
FIG. 6 is a cross sectional view taken along line 6—6 of FIG. 3.

With reference now to the drawings, and in particular to FIGS. 1 through 6 thereof, a new Shopping Cart Handle Cover embodying the principles and concepts of the present invention and generally designated by the reference numeral 10 will be described.

More specifically, it will be noted that the Shopping Cart Handle Cover 10 comprises a wrap around handle cover 12 removably surrounding a shopping cart handle 50, and a strap apparatus 20.

As best illustrated in FIG. 1, it can be shown that the shopping cart handle 50 is attached to an unnumbered shopping cart. The wrap around handle cover 12 has a wrap around attachment means 16 as shown in FIG. 3 of the drawings. The wrap around attachment means 16 has an attachment receiving means 28. The wrap around attachment means 16 is preferably constructed from Velcro. The wrap around handle cover 12 has one or more strap apparatus 20 as best shown in FIG. 1 of the drawings. The strap apparatus 20 has a hanging means 22 and a holding means 24. The holding means 24 has a holding attachment means 26. The holding attachment means 26 has a holding attachment receiving means 28. The strap apparatus 20 is adapted to hold a toy 60 as shown in FIG. 1 of the drawings. The strap apparatus 20 is adapted to hold an unnumbered bottle. The wrap around handle cover 12 preferably comprises a fabric cover 40 and a padding fill 42.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A Shopping Cart Handle Cover for covering an elongate handle bar of a shopping cart, comprising:

a handle cover for wrapping about the handle bar of a shopping cart, said handle cover comprising a panel of flexible sheet material having lateral edges defining a width therebetween, said width being sufficient to wrap the panel about the handle bar of a shopping cart with lateral portions of the panel adjacent to said lateral edges overlapping each other, attachment means mounted on said handle cover for attaching the overlapped lateral portions of said panel together when said panel is wrapped about a handle bar; and at least one adjustable fastening structure attached to said handle cover for removably suspending items from said handle cover, each said fastening structure comprising a hanging strap fixedly attached at one end to said handle cover in a manner preventing removal of said hanging strap from said handle cover, and an adjustable securing band fixedly attached at a medial location of said securing band to the other end of said hanging strap, wherein the adjustable securing band of said adjustable fastening structure has adjustable securing means mounted on the opposite free end portions of said securing band to permit said securing band to be formed into a loop of adjustable circumference length to snugly fit the perimeter size on an item to be suspended from said handle cover.

2. The Shopping Cart Handle Cover of claim 1, wherein the hanging strap is sewn to the handle cover.

3. The Shopping Cart Handle Cover of claim 2, wherein the attachment means comprises hook and loop fastener means mounted on opposite lateral edges of the panel of said handle cover.

4. The Shopping Cart Handle Cover of claim 1, wherein the attachment means comprises a plurality of strips of hook fastener means and strips of loop fastener means each mounted on the lateral portions of said panel in an orientation substantially perpendicular to the lateral edges of said panel.

5. The Shopping Cart Handle Cover of claim 1, wherein the securing band is sewn to the hanging strap.

6. The Shopping Cart Handle Cover of claim 1 comprising at least two adjustable fastening structures.

7. The Shopping Cart Handle Cover of claim 6, wherein the securing band of one of said adjustable fastening structures has a width dimension substantially equal to the width of the hanging strap of said structure and the securing band of the other said adjustable fastening structure has a width dimension at least three times greater than the width of the hanging strap of said structure.

8. The Shopping Cart Handle Cover of claim 1 wherein the adjustable securing means on each securing band comprises hook and loop fastening means mounted at the opposite end portions of the securing band to permit attachment of the end portions to form a loop of various circumference lengths.

9. The Shopping Cart Handle Cover of claim 1 wherein the handle cover comprises two panels of flexible sheet material with a layer of a padding fill situated therebetween.

10. A Shopping Cart Handle Cover for covering an elongate handle bar of a shopping cart, comprising:

a handle cover for wrapping about the handle bar of a shopping cart, said handle cover comprising a panel of flexible sheet material having lateral edges defining a width therebetween, said width being sufficient to wrap the panel about the handle bar of a shopping cart with lateral portions of the panel adjacent to said lateral edges overlapping each other, attachment means mounted on said handle cover for attaching the overlapped lateral portions of said panel together when said panel is wrapped about a handle bar, said attachment means comprising hook and loop fastener means mounted on opposite lateral edges of the panel of said handle cover, said hook and loop fastener means comprising a plurality of strips of hook fastener means and strips of loop fastener means each mounted on the lateral portions of said panel in an orientation substantially perpendicular to the lateral edges of said panel; and at least two adjustable fastening structures attached to said handle cover for removably suspending items from said handle cover, each said fastening structure comprising a hanging strap sewn at one end to said handle cover to prevent removal of said hanging strap from said handle cover, and an expandable securing band sewn at a medial location of said band to the other end of said hanging strap, wherein the securing band of one of said adjustable fastening structures has a width dimension substantially equal to the width of the hanging strap of said structure, and the securing band of the other said adjustable fastening structure has a width dimension at least three times greater than the width of the hanging strap of said structure wherein the expandable securing band of said adjustable fastening structure has hook and loop fastener means mounted on the opposite free end portions of said securing band to permit said band to be formed into a loop of adjustable circumference length to snugly fit the perimeter size on an item.

* * * * *